United States Patent
Kouno et al.

(10) Patent No.: US 10,017,009 B2
(45) Date of Patent: Jul. 10, 2018

(54) PNEUMATIC TIRE

(71) Applicant: BRIDGESTONE CORPORATION, Chuo-ku, Tokyo (JP)

(72) Inventors: Yoshihide Kouno, Tokyo (JP); Seiji Kon, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 277 days.

(21) Appl. No.: 14/900,174

(22) PCT Filed: Jul. 10, 2014

(86) PCT No.: PCT/JP2014/068496
§ 371 (c)(1),
(2) Date: Dec. 21, 2015

(87) PCT Pub. No.: WO2015/005450
PCT Pub. Date: Jan. 15, 2015

(65) Prior Publication Data
US 2016/0152077 A1   Jun. 2, 2016

(30) Foreign Application Priority Data

Jul. 11, 2013   (JP) .................................. 2013-145807

(51) Int. Cl.
| *B60C 5/01* | (2006.01) |
| *B60C 13/02* | (2006.01) |
| *B60C 9/22* | (2006.01) |
| *B60C 13/04* | (2006.01) |
| *B60C 13/00* | (2006.01) |

(52) U.S. Cl.
CPC .................. *B60C 5/01* (2013.01); *B60C 9/22* (2013.01); *B60C 13/02* (2013.01); B60C 2013/005 (2013.01); B60C 2013/026 (2013.01); B60C 2013/045 (2013.01)

(58) Field of Classification Search
CPC ....... B60C 13/00; B60C 13/002; B60C 13/02; B60C 13/04; B60C 2013/026; B60C 2013/045; B60C 5/01
See application file for complete search history.

(56) References Cited

U.S. PATENT DOCUMENTS

| 3,782,440 A | 1/1974 | Depmeyer |
| 2011/0297289 A1* | 12/2011 | Kouno ............... B29D 30/1628 152/539 |
| 2014/0034199 A1* | 2/2014 | Buxton ................... B60C 11/00 152/167 |

FOREIGN PATENT DOCUMENTS

| EP | 0374081 A2 | 6/1990 |
| EP | 1316580 * | 6/2003 |

(Continued)

OTHER PUBLICATIONS

English machine translation of JP01-202504. (Year: 1989).*
English machine translation of JP2012-140070. (Year: 2012).*

*Primary Examiner* — Robert C Dye
(74) *Attorney, Agent, or Firm* — Solaris Intellectual Property Group, PLLC

(57) ABSTRACT

A tire is provided with a tire frame member that is made from resin and includes: a bead portion; a side portion that is connected to an outer side of the bead portion in a tire radial direction and that has hole portions formed at intervals in a tire circumferential direction; and a crown portion that is connected to an inner side of the side portion in a tire width direction and that has a tread disposed thereon.

7 Claims, 6 Drawing Sheets

(56) References Cited

FOREIGN PATENT DOCUMENTS

| EP | 2565058 A1 | | 3/2013 |
|---|---|---|---|
| GB | 1442147 | * | 7/1976 |
| JP | 01-202504 | * | 8/1989 |
| JP | H03-143701 A | | 6/1991 |
| JP | 2004-175133 A | | 6/2004 |
| JP | 2006-248318 A | | 9/2006 |
| JP | 2012-106444 A | | 6/2012 |
| JP | 2012-140070 A | | 7/2012 |

* cited by examiner

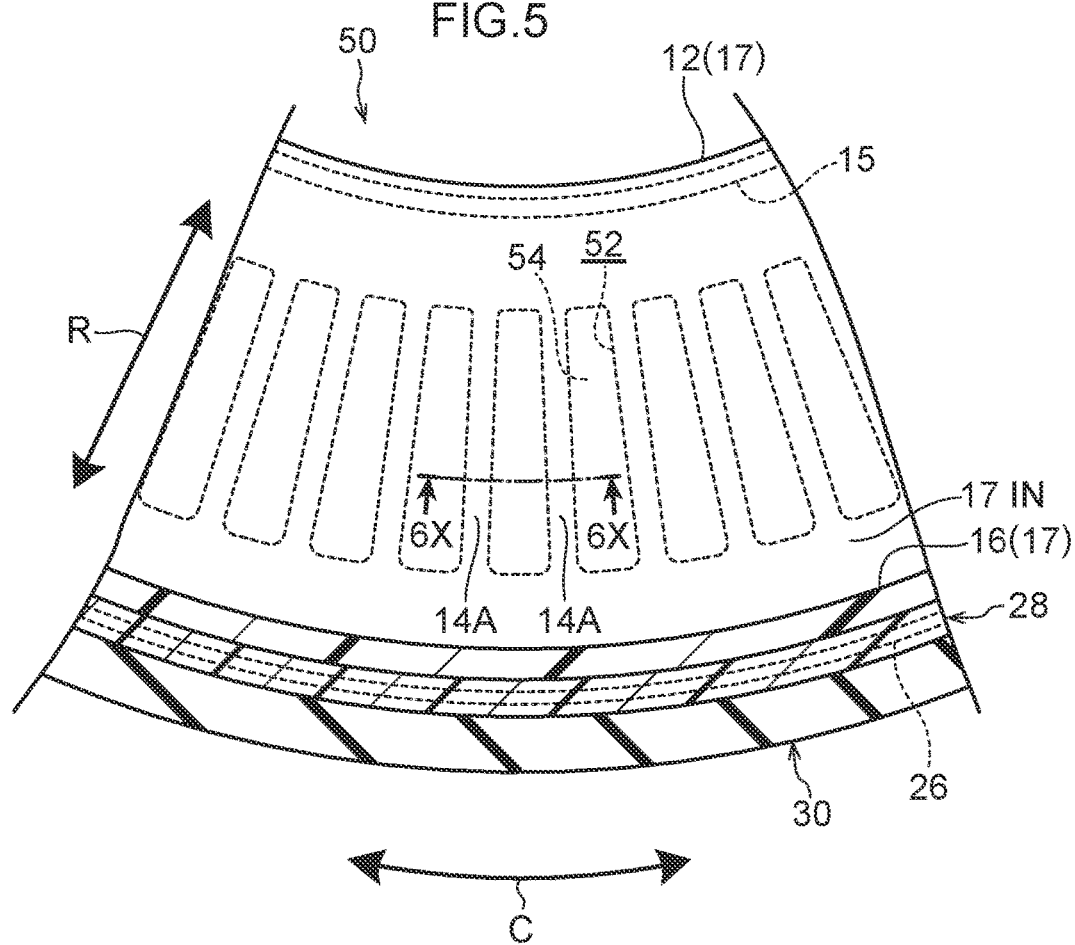
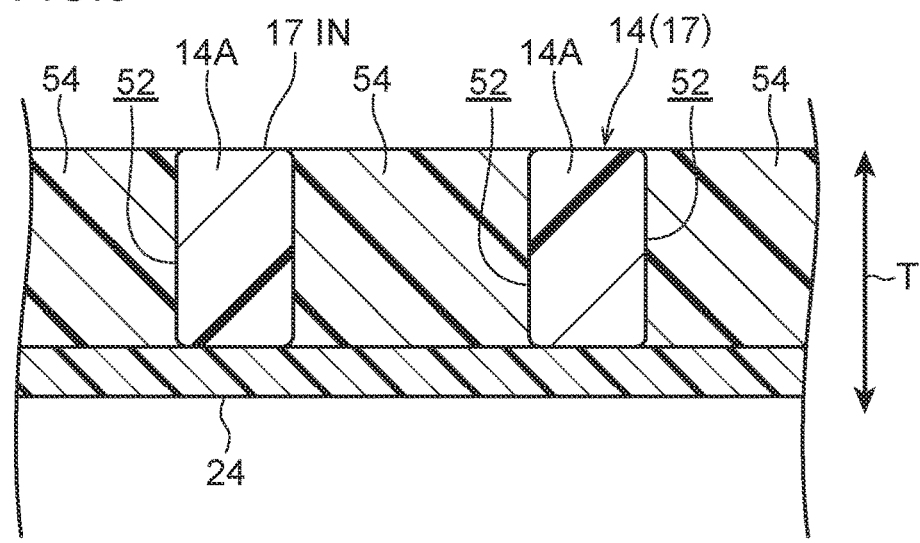

PNEUMATIC TIRE

TECHNICAL FIELD

The present invention relates to a pneumatic tire, and in particular, to a pneumatic tire in which a tire frame member is formed using a resin material.

BACKGROUND ART

Pneumatic tires formed from rubber, organic fiber materials, and steel members are already known. There is recently demand, from the viewpoints of weight reduction and ease of recycling, to make tire frame members from thermoplastic polymers such as thermoplastic elastomers (TPE) and thermoplastic resins. A pneumatic tire formed employing a tire frame member formed by covering a bead core with a thermoplastic elastomer is described, for example, in Japanese Patent Application Laid-Open (JP-A) No. H03-143701.

SUMMARY OF INVENTION

Technical Problem

For a tire frame member formed with a resin material in this manner, compression force acts on a tire inner face during vehicle travel. Alleviating the stress and strain due to this compression force is linked to improving the durability of the tire.

In consideration of the above circumstances, the present invention addresses reducing the load on a tire due to compression force acting on the tire inner face.

Solution to Problem

A tire of a first aspect of the present invention includes a tire frame member that is made from a resin and includes: a bead portion; a side portion that is connected to an outer side of the bead portion in a tire radial direction and that has hole portions formed at intervals in a tire circumferential direction; and a crown portion that is connected to an inner side of the side portion in a tire width direction and that has a tread disposed thereon.

Advantageous Effects of Invention

As explained above, the tire according to the present invention enables load due to the compression force acting on the inner face of the tire to be reduced.

BRIEF DESCRIPTION OF DRAWINGS

FIG. 5 is a cross section sectioned along line 5X-5X in FIG. 4.

FIG. 6 is a cross section sectioned along line 6X-6X in FIG. 5.

DESCRIPTION OF EMBODIMENTS

Figure 1:
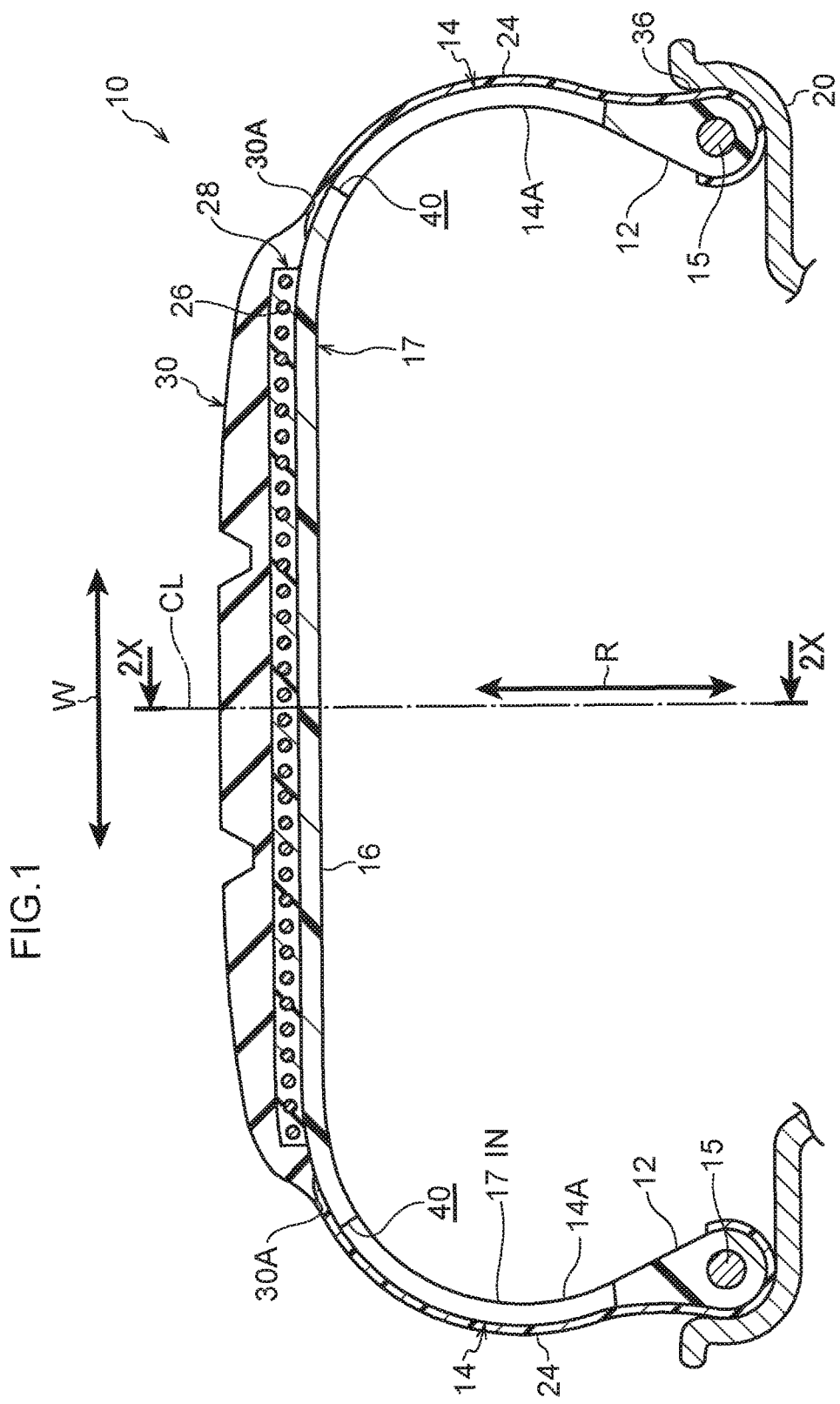
FIG. 1 is a cross section of a tire according to a first exemplary embodiment of the present invention.

Explanation follows regarding exemplary embodiments of the present invention, while giving examples of exemplary embodiments. In the drawings, the arrow W indicates the tire axial direction, the arrow R indicates the tire radial direction (a direction orthogonal to the tire axis (not illustrated in the drawings)), and the arrow C indicates the tire circumferential direction. Note that the tire axial direction is interchangeable with references to the tire width direction. Hereafter, a tire axis side in the tire radial direction is referred to as a "tire radial direction inner side" and the opposite side to the tire axis side in the tire radial direction is referred to as a "tire radial direction outer side". An equatorial plane CL side of a tire 10 in the tire axial direction is referred to as a "tire axial direction inner side" and the opposite side to the equatorial plane CL of the tire 10 in the tire axial direction is referred to as a "tire axial direction outer side".

Note that the method for measuring the dimensions of each part is according to the methods listed in the Japan Automobile Tire Manufacturer's Association (JATMA) YEAR BOOK 2013.

First Exemplary Embodiment

As illustrated in FIG. 1, the tire 10 of the first exemplary embodiment employs a pneumatic tire internally filled with air. The tire 10 includes a tire frame member 17 made of resin and formed in a circular shape. The tire frame member 17 includes a pair of bead portions 12 disposed with a separation to each other in the tire axial direction, side portions 14 connected to the tire radial direction outer side of each bead portion 12, and a crown portion 16 that is connected to the tire width direction inner side of the side portions 14 and that joins the respective tire radial direction outer side ends of each of the side portions 14 together.

The tire frame member 17 is formed with a resin material as a main raw material. Here, the term resin material does not include vulcanized rubber. Examples of the resin material include thermoplastic resins (including thermoplastic elastomers), thermosetting resins, and other general use resins, as well as engineering plastics (including super engineering plastics).

Thermoplastic resins (including thermoplastic elastomers) are polymer compounds of materials that soften and flow with increasing temperature, and that adopt a relatively hard and strong state when cooled. In the present specification, out of these, distinction is made between polymer compounds of materials that soften and flow with increasing temperature, that adopt a relatively hard and strong state on cooling, and that have a rubber-like elasticity, considered to be thermoplastic elastomers, and polymer compounds of materials that soften and flow with increasing temperature, that adopt a relatively hard and strong state on cooling, and do not have a rubber-like elasticity, considered to be non-elastomer thermoplastic resins.

Examples of thermoplastic resins (including thermoplastic elastomers) include thermoplastic polyolefin-based elastomers (TPO), thermoplastic polystyrene-based elastomers (TPS), thermoplastic polyamide-based elastomers (TPA), thermoplastic polyurethane-based elastomers (TPU), thermoplastic polyester-based elastomers (TPC), and thermoplastic dynamically crosslinking-type elastomers (TPV), as well as thermoplastic polyolefin-based resins, thermoplastic polystyrene-based resins, thermoplastic polyamide-based resins, and thermoplastic polyester-based resins.

Such thermoplastic materials have, for example, a deflection temperature under load (at loading of 0.45 MPa), as defined by ISO 75-2 or ASTM D648, of 78° C. or greater, a tensile yield strength, as defined by JIS K7113, of 10 MPa or greater, and a tensile elongation at break (JIS K7113), also as defined by JIS K7113, of 50% or greater. Materials with a Vicat softening temperature, as defined in JIS K7206 (method A), of 130° C. may be employed.

Thermosetting resins refers to polymer compounds that form a three-dimensional mesh structure with increasing temperature, and harden. Examples of the thermosetting resin include phenolic resins, epoxy resins, melamine resins, and urea resins.

In addition to the thermoplastic resins (including thermoplastic elastomers) and thermosetting resins already listed above, general purpose resins may also be employed as the resin material, such as meth(acrylic)-based resins, EVA resins, vinyl chloride resins, fluororesins, and silicone-based resins.

The tire frame member 17 may be formed from a single resin material, or from resin materials having different characteristics from each other in each of the locations (the bead portions 12, the side portions 14, the crown portion 16, and the like) of the tire frame member 17.

In the present exemplary embodiment, the tire frame member 17 is formed by employing a resin material having a Young's modulus of from 100 MPa to 900 MPa.

As illustrated in FIG. 1, a bead core 15, which has an annular shape extending around the tire circumferential direction, is embedded inside each of the bead portions 12, at a location of the tire 10 for fitting to a rim 20. Note that here "bead portion" refers to a range from a tire radial direction inner side end as far as 30% of the tire cross section height. The bead core 15 is configured by a bead cord, such as a metal cord (such as a steel cord), an organic fiber cord, a resin-covered organic fiber cord, or one from a hard resin (not illustrated in the drawings). The bead core 15 may be omitted as long as the rigidity of the bead portion 12 is sufficiently secured.

The side portion 14, this being a location configuring a side portion of the tire 10, gently curves so as to protrude from the bead portion 12 toward the tire axial direction outer side on progression toward the crown portion 16. Plural hole portions 40, described later, are formed to each side portion 14.

An outer peripheral face of the crown portion 16, this being a location that supports a tread 30 disposed on the tire radial direction outer side, described later, is configured with a substantially flat shape along the tire axial direction.

A belt layer 28 is disposed at the tire radial direction outer side of the crown portion 16. The belt layer 28 is configured with resin-covered reinforcement cords 26 wound in spiral shapes in the tire circumferential direction.

The tread 30 is disposed at the tire radial direction outer side of the belt layer 28. The tread 30 covers the belt layer 28. Moreover, a tread pattern (not illustrated in the drawings) is formed to the contact surface of the tread 30 that contacts the road surface.

A protection layer 24 is disposed to an outer face (tire axial direction outer side surface) of the tire frame member 17 corresponding to the side portion 14. The protection layer 24 is formed from a material (for example, a resin material or a vulcanized rubber) that is softer and has higher weather resistance than the tire frame member 17. The protection layer 24 of the present exemplary embodiment is folded back from an inner face at the tire axial direction inner side of the bead portion 12 to an outer face at the tire axial direction outer side of the bead portion 12, and extends as far as the vicinity of an end portion on the tire axial direction outer side of the belt layer 28 via the outer face of the side portion 14. An extension end portion of the protection layer 24 (an end portion on the belt layer 28 side thereof) is thus covered by the tread 30.

Figure 2:
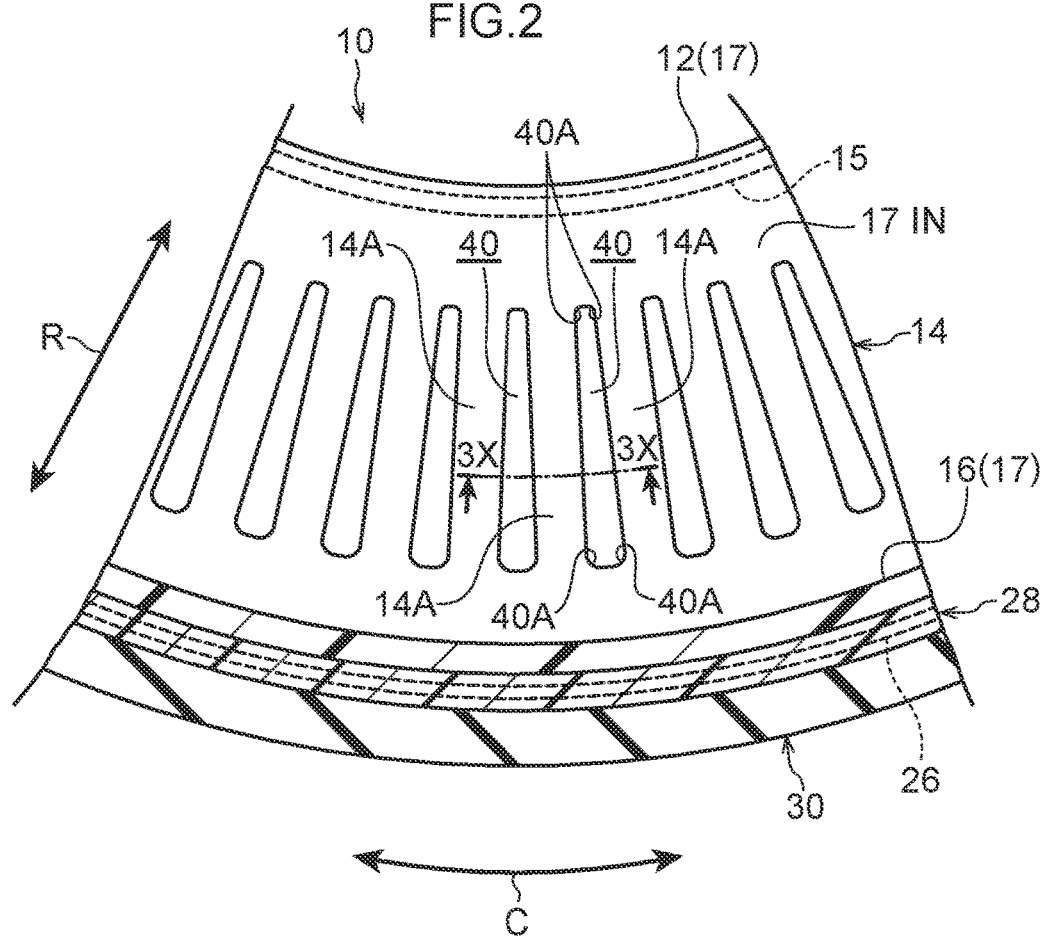
FIG. 2 is a cross section of the tire in FIG. 1, sectioned along line 2X-2X.

As illustrated in FIG. 1 and FIG. 2, hole portions 40 are formed in the side portions 14 at intervals (uniform intervals in the present exemplary embodiment) in the tire circumferential direction. The hole portions 40 are through hole portions penetrating the side portions 14 and extend from the tire radial direction inner side toward the tire radial direction outer side (in other words, the openings of the hole portions 40 extend from the tire radial direction inner side to the tire radial direction outer side).

Each of the hole portions 40 of the present exemplary embodiment is configured with a length direction (length direction of the opening) running along the tire radial direction. Namely, each of the hole portions 40 is configured as an elongated hole portion with its length (hole length) in the tire radial direction greater than its width (hole width) in the tire circumferential direction. Note that the present invention is not limited to the above configuration, and the hole portions 40 may be configured with their length directions inclined to the tire radial direction (for example, may be inclined straight line shapes, or may be inclined curved line shapes).

As illustrated in FIG. 2, corner portions 40A of the hole portions 40 are rounded.

Figure 3:
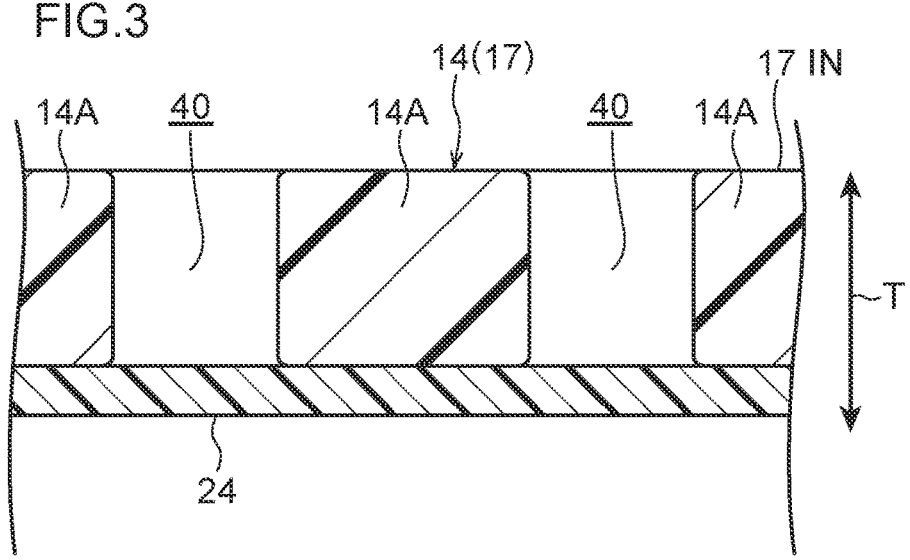
FIG. 3 is a cross section of the tire in FIG. 2, sectioned along line 3X-3X.

As illustrated in FIG. 1 and FIG. 3, the hole portions 40 are covered by the protection layer 24 mentioned above. Airtight sealing of the interior (space filled with air) of the tire 10 is thereby maintained.

It is sufficient for the hole portions 40 to be formed to each of the side portions 14 between a tread end portion 30A in the tire axial direction of the tread 30 and a rim separation point 36. This is due to there being substantially no deformation of the tire 10 further to the tire radial direction inner side than at the rim separation point 36, and there being a low need to form the hole portions 40 there. This is also due to the tread 30 being disposed further to the tire axial direction inner side than the tread end portion 30A. The rigidity of the tire frame member 17 is also more easily maintained than in cases in which the hole portions 40 are formed to portions (portions not liable to deform) that are less liable to be affected by application of load.

Note that here the "rim separation point" is a point where a tire separates from a rim flange when mounted to the appropriate rim according to the dimensions of the tire as listed in the Japan Automobile Tire Manufacturer's Association (JATMA) YEAR BOOK 2013 and in an un-loaded state at the internal pressure specified therein.

As illustrated in FIG. 2, the hole width of the hole portions 40 widens on progression from the tire radial direction inner side toward the outer side. Specifically, the hole width of the hole portions 40 along the tire radial direction is set such that the width of a support portion 14A formed between adjacent hole portions 40 in the tire circumferential direction of the side portion 14 is substantially even along the tire radial direction. In this manner, load acting on the support portions 14A is capable of being made substantially even due to the width of the support portion 14A being substantially even in the tire radial direction. Note that the present invention is not limited to the above configuration.

Next, explanation follows regarding operation and advantageous effects of the tire 10 according to the present exemplary embodiment.

In the tire 10, hole portions 40 are formed to the side portions 14 of the tire frame member 17, such that the resin at the inner face 17 IN of the tire frame member 17 readily deforms, alleviating stress and strain arising due to compression force acting on the inner face 17 IN. Stress and strain arising due to tensile force acting on the outer face of the tire frame member 17 is also alleviated. Moreover, stress and strain due to compression force acting on inner face 17 IN can be alleviated substantially evenly around the tire circumferential direction due to forming the hole portions 40 at intervals (uniform intervals in the present exemplary embodiment) around the tire circumferential direction. Load on the tire frame member 17 formed from a resin material can thereby be reduced.

Moreover, a weight reduction in the tire 10 can be achieved by forming the hole portions 40.

In the tire 10, the hole portions 40 are configured extending from the tire radial direction inner side toward the outer side, and are configured with the length of the hole portions 40 in the tire radial direction greater than the width in the tire circumferential direction, such that the rigidity of the tire frame member 17 (side portion 14) in the tire radial direction can be secured while obtaining the advantageous effect of alleviating stress and strain due to compression force acting on the tire inner face.

Moreover, the corner portions 40A of the hole portions 40 are rounded, such that concentration of stress on the corner portions 40A can be suppressed.

The weather resistance of the tire 10 can be improved by disposing the protection layer 24 on the outer face of the tire frame member 17 corresponding to the side portion 14. Air leaks from the hole portions 40 are capable of being prevented due to the hole portions 40 being covered with the protection layer 24.

In the first exemplary embodiment, as illustrated in FIG. 3, the hole width of the hole portions 40 is substantially uniform along the thickness direction (the arrow T direction in FIG. 3) of the side portions 14; however, the present invention is not limited thereto, and the hole width of the hole portions 40 may be made to differ in the thickness direction of the side portions 14. For example, the hole walls of the hole portions 40 may be inclined in straight line shapes or curved line shapes with respect to the thickness direction of the side portions 14 such that the hole widths narrow on progression along the thickness direction of the side portions 14, or may be inclined toward the opposite side such that the hole width widens on progression along the thickness direction of the side portion 14. Moreover, a step may be formed to the hole walls of the hole portions 40, thereby narrowing or widening the hole width on progression along the thickness direction of the side portion 14.

Second Exemplary Embodiment

Explanation follows regarding a tire 50 of a second exemplary embodiment. Note that configuration similar to that of the first exemplary embodiment is appended with the same reference numerals, and explanation thereof is omitted.

Figure 4:
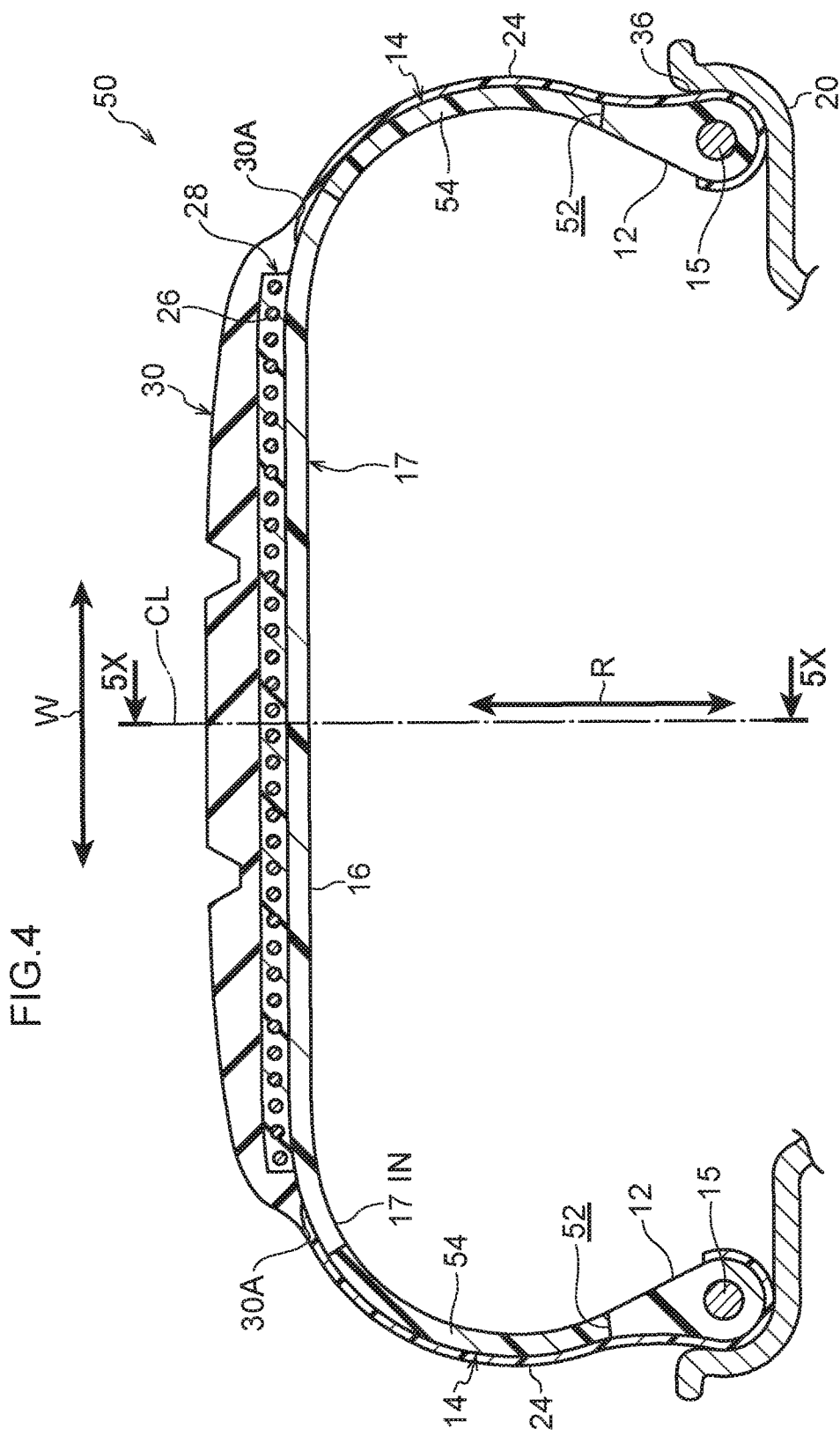
FIG. 4 is a cross section of a tire according to a second exemplary embodiment of the present invention.

As illustrated in FIG. 4 to FIG. 6, the tire 50 of the present exemplary embodiment is configured the same as the tire 10 of the first exemplary embodiment, except for configuration of a soft material (explained in detail later) infilling hole portions 52 provided in the side portions 14.

As illustrated in FIG. 5, hole portions 52 are formed in the side portions 14 of the tire 50 in substantially the same shape as the hole portions 40 of the first exemplary embodiment. As illustrated in FIG. 4 to FIG. 6, soft portions 54 are formed by infilling the gaps of the hole portions 52 with a material (for example, a resin material or a vulcanized rubber) that is softer than the resin material used to form the tire frame member 17. Note that here "a material that is softer" denotes a material with a lower Young's modulus than the resin material used to form the tire frame member 17.

Moreover, in the present exemplary embodiment, as illustrated in FIG. 6, the surfaces of the soft portions 54 are configured flush with the inner face 17 IN of the tire frame member 17; however, the present invention is not limited to such a configuration, and the surfaces of the soft portions 54 may be lower than the inner face 17 IN.

Is it preferable that the Young's modulus of the soft material used to form the soft portions 54 is two-thirds that of the resin material used to form the tire frame member 17, or less.

Note that in the present exemplary embodiment, the soft portions 54 and the protection layer 24 are formed with different soft materials; however, the present invention is not limited to this configuration, and the soft portions 54 and the protection layer 24 may be formed from the same resin material. Cases in which the soft portions 54 and the protection layer 24 are formed from the same resin material enable the manufacturing process to be shortened, and enable a reduction in the cost of the tire 50 to be achieved.

Next, explanation follows regarding the operation and advantageous effects of the tire 50 of the present exemplary embodiment. Note that out of the operation and advantageous effects of the present exemplary embodiment, operation and advantageous effects similar to the operation and advantageous effects obtained by the first exemplary embodiment are omitted from explanation as appropriate.

In the tire 50, due to infilling the hole portions 52 with a resin material softer than the resin material forming the tire frame member 17, a step change in the rigidity of the tire frame member 17 (the side portions 14) in the tire circumferential direction can be alleviated, while also alleviating stress and strain due to compression force acting on the inner face 17 IN forming the soft portions 54.

Third Exemplary Embodiment

Explanation follows regarding a tire 60 of a third exemplary embodiment. Note that configuration similar to that of the second exemplary embodiment is appended with the same reference numerals, and explanation thereof is omitted.

Figure 7:
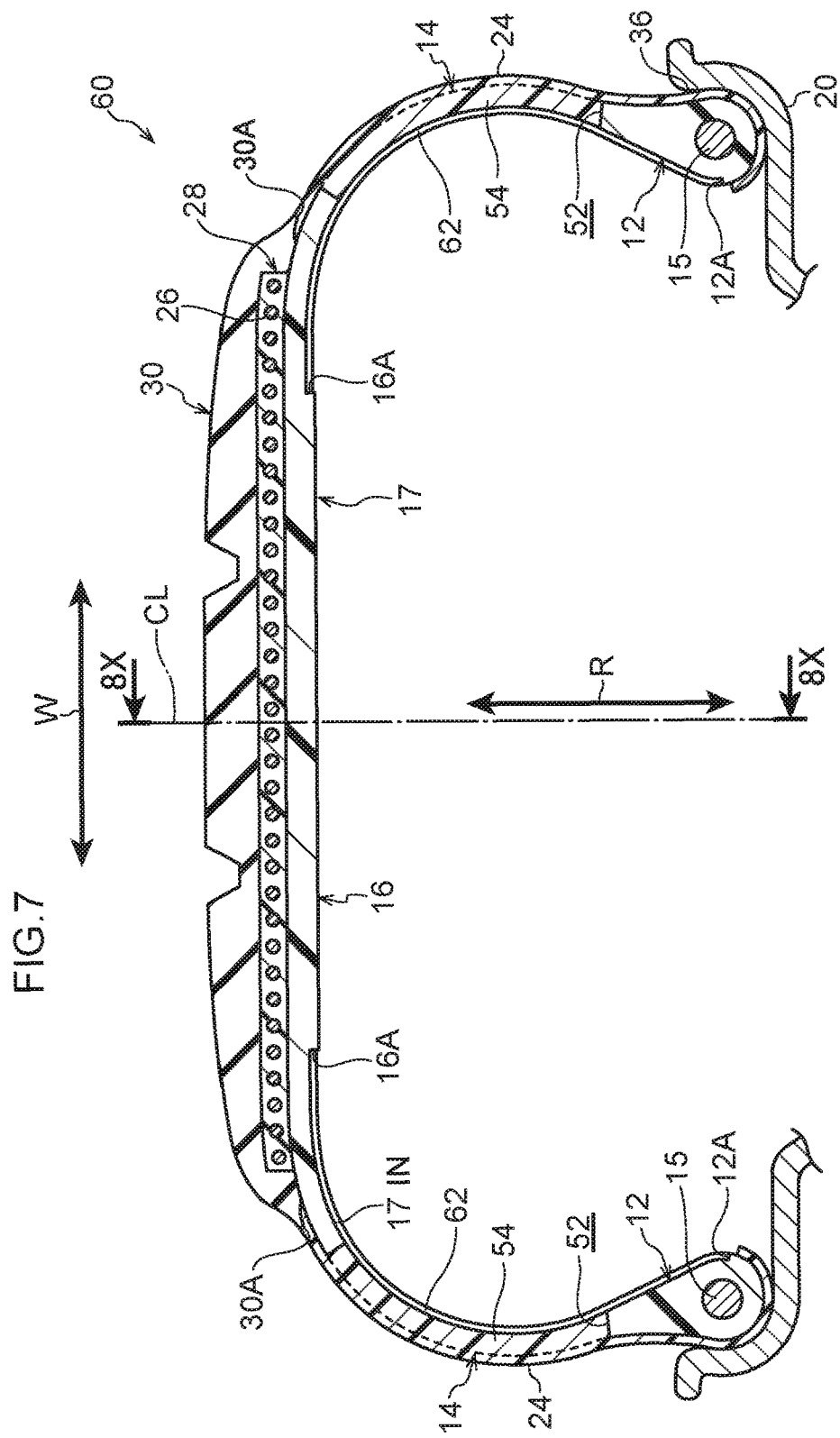
FIG. 7 is a cross section of a tire according to a third exemplary embodiment of the present invention.
Figure 9:
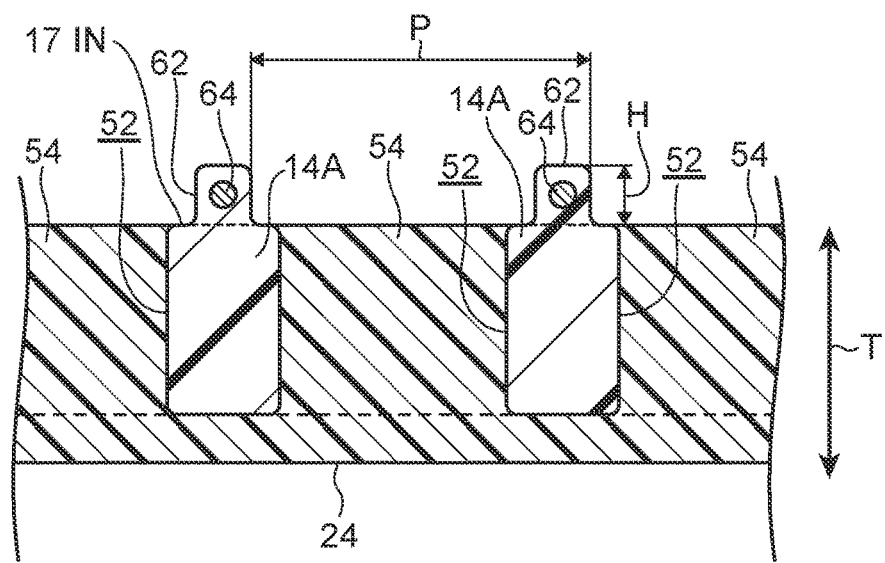
FIG. 9 is a cross section sectioned along line 9X-9X in FIG. 8.

As illustrated in FIG. 7 and FIG. 9, the tire 60 of the present exemplary embodiment is configured the same as the tire 50 of the second exemplary embodiment, except for configuration of ribs 62 extending in the tire radial direction between adjacent hole portions 52 on the inner face 17 IN of the tire frame member 17.

Figure 8:
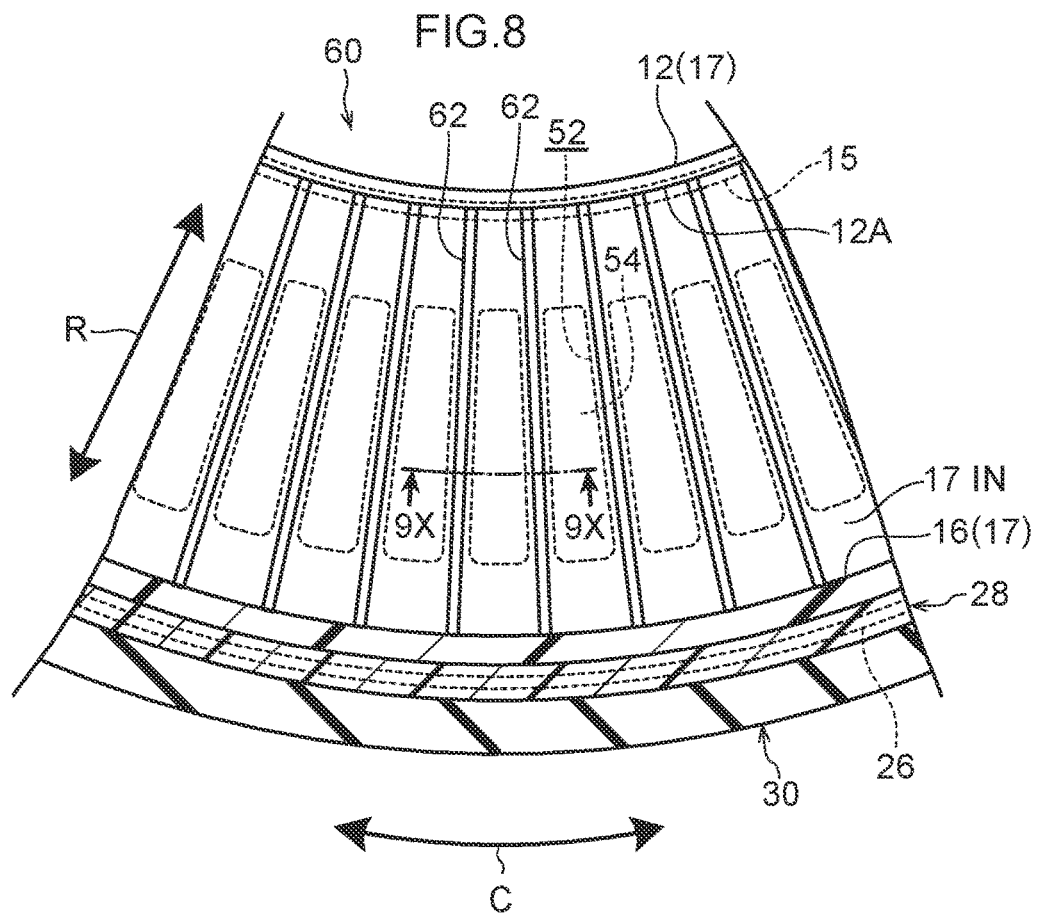
FIG. 8 is a cross section sectioned along line 8X-8X in FIG. 7.

As illustrated in FIG. 7 and FIG. 8, the ribs 62 (projection portions rising from the inner face 17 IN illustrated in FIG. 9) are formed between the hole portions 52 of the inner face 17 IN of the tire frame member 17 so as to extend from the bead portions 12 to below end portions of the belt layer 28. Specifically, one end portion of each of the ribs 62 reaches as far as a support face 12A of the bead portion 12, and the other end portion of each of the ribs 62 reaches as far as a support face 16A of the crown portion 16.

Note that the projection portions are formed projecting out toward the tire axial direction inner side at locations corresponding to the bead core 15 on the inner face of the bead portion 12 of the present exemplary embodiment. An inner face (upper face in FIG. 8) on the tire radial direction outer side of the projection portion configures the support face 12A supporting one end portion of the ribs 62. A tire axial direction central portion of the crown portion 16 of the present exemplary embodiment rises further toward the tire radial direction inner side than end portion sides thereof. Side faces on the tire axial direction outer side of this raised portion configure the support faces 16A supporting the other end portions of the ribs 62.

The ribs 62 are formed with the same resin material as the resin material forming the tire frame member 17. Note that configuration of the present invention is not limited thereto, and the resin material forming the ribs 62 may be a different to the resin material forming the tire frame member 17.

As illustrated in FIG. 9, a reinforcement cord 64 running along the extension direction of the ribs 62 is embedded inside each of the ribs 62. The reinforcement cords 64 reinforce the ribs 62, and the two ends of the reinforcement cords 64 each reach as far as the two ends of the rib 62. A twisted chord or an assembly of plural filaments, for example, serves as the reinforcement cord 64. An aliphatic polyamide, polyethylene-terephthalate, glass, aramid, or metal such as steel may be employed as the material for the reinforcement cord 64.

The height H of the ribs 62 is preferably from 0.5 mm to 2.5 mm. The tensile load borne by the rib 62 is too small when less than 0.5 mm, and the tire frame member 17 becomes too heavy when over 2.5 mm.

A placement interval P of the ribs 62 is preferably from 0.5 mm to 10 mm. Molding operations are difficult when less than 0.5 mm, and the strength required in the side portion 14 is difficult to secure when over 10 mm.

Next, explanation follows regarding operation and advantageous effects of the tire 60 of the present exemplary embodiment. Note that out of the operation and advantageous effects of the present exemplary embodiment, operation and advantageous effects similar to the operation and advantageous effects obtained by the first exemplary embodiment are omitted from explanation as appropriate.

In the tire 60, ribs 62 are formed extending from the bead portions 12 to the side portions 14 between adjacent hole portions 52 in the tire circumferential direction on the inner face 17 IN of the tire frame member 17, such that the ribs 62 are capable of bearing tensile force occurring in the tire 60. Ability to withstand internal pressure is thereby improved.

In the tire 60, reinforcement cords 64 are embedded in the ribs 62 such that tensile strength of the ribs 62 is improved, and ability to withstand internal pressure is further improved.

Moreover, in the tire 60, the two end portions of each rib 62 are respectively supported by the support face 12A and support face 16A, since one end portion of the rib 62 reaches the support face 12A, and the other end portion of the rib 62 reaches the support face 16A. Ability to withstand internal pressure can thereby be effectively improved.

Note that the configuration of the ribs 62 of the present exemplary embodiment may also be applied to the first exemplary embodiment.

In the first exemplary embodiment, as illustrated in FIG. 2, the hole portions 40 are configured as elongated hole portions; however, configuration of the present invention is not limited thereto, and the hole portions 40 may be configured as round hole portions, rectangular hole portions, or elliptical hole portions. In the first exemplary embodiment, as illustrated in FIG. 2, the hole portions 40 having their length directions along the tire radial direction are formed at intervals in the tire circumferential direction; however, configuration of the present invention is not limited thereto, and, for example, rows of plural hole portions (for example, round hole portions) arrayed along the tire radial direction may be formed at intervals in the tire circumferential direction. Note that the above configuration may be applied to the second and the third exemplary embodiments.

Although examples have been given above to explain exemplary embodiments of the present invention, these are merely examples of embodiments, and various modifications may be made within a range not departing from the spirit of the present invention. Moreover, obviously the scope of rights of the present invention is not limited by these exemplary embodiments.

The entirety of the disclosure of JP-A No. 2013-145807 filed on Jul. 11, 2013 is incorporated by reference in the present specification.

The invention claimed is:

1. A tire, comprising a tire frame member that is made from a resin and that includes:
   a bead portion;
   a side portion that is connected to an outer side of the bead portion in a tire radial direction and that has hole portions formed at intervals in a tire circumferential direction, the hole portions being through holes that penetrate the side portion; and
   a crown portion that is connected to an inner side of the side portion in a tire width direction and that has a tread disposed thereon,
   wherein a protection layer configured from a weather resistant material is disposed on an outer face of the tire frame member corresponding to the side portion, such that the hole portions are covered by the protection layer.

2. The tire of claim 1, wherein the hole portions extend from an inner side toward an outer side in the tire radial direction, and have a length in the tire radial direction that is greater than their width in the tire circumferential direction.

3. The tire of claim 1, wherein corner portions of the hole portions are rounded.

4. The tire of claim 1, wherein the hole portions are infilled with a softer material than the resin material forming the tire frame member.

5. The tire of claim 1, wherein ribs extending from the bead portion to the side portion are formed on an inner face of the tire frame member between adjacent hole portions in the tire circumferential direction.

6. The tire claim 5, wherein reinforcement cords are embedded inside the ribs.

7. A tire, comprising a tire frame member that is made from a resin and that includes:
   a bead portion;
   a side portion that is connected to an outer side of the bead portion in a tire radial direction and that has hole portions formed at intervals in a tire circumferential direction; and
   a crown portion that is connected to an inner side of the side portion in a tire width direction and that has a tread disposed thereon,
   wherein ribs extending from the bead portion to the side portion are formed on an inner face of the tire frame member between adjacent hole portions in the tire circumferential direction, and reinforcement cords are embedded inside the ribs.

\* \* \* \* \*